United States Patent
Ito

(10) Patent No.: US 8,636,095 B2
(45) Date of Patent: Jan. 28, 2014

(54) ELECTRIC POWER-ASSISTED BICYCLE

(75) Inventor: Kiyohiro Ito, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/577,684

(22) PCT Filed: Feb. 9, 2011

(86) PCT No.: PCT/JP2011/052743
§ 371 (c)(1),
(2), (4) Date: Aug. 8, 2012

(87) PCT Pub. No.: WO2011/102275
PCT Pub. Date: Aug. 25, 2011

(65) Prior Publication Data
US 2012/0305325 A1 Dec. 6, 2012

(30) Foreign Application Priority Data

Feb. 18, 2010 (JP) ................................ 2010-033430

(51) Int. Cl.
*B62M 6/65* (2010.01)
*B62M 6/90* (2010.01)

(52) U.S. Cl.
USPC .......................... 180/206.6; 180/65.51; 474/5

(58) Field of Classification Search
USPC ................. 180/65.51, 205.1–207.3
See application file for complete search history.

(56) References Cited

U.S. PATENT DOCUMENTS

| 6,100,615 A * | 8/2000 | Birkestrand ................. 310/75 C |
| 6,276,475 B1 * | 8/2001 | Nakanosono ................. 180/65.8 |
| 6,974,399 B2 * | 12/2005 | Lo ...................................... 475/5 |

FOREIGN PATENT DOCUMENTS

| JP | 9-058568 | 3/1997 |
| JP | 11-255177 | 9/1999 |
| JP | 2000-043780 | 2/2000 |
| JP | 2002-293285 | 10/2002 |
| JP | 2003-160089 | 6/2003 |

OTHER PUBLICATIONS

International Search Report issued May 10, 2011 in International (PCT) Application No. PCT/JP2011/052743.

* cited by examiner

*Primary Examiner* — Tony Winner
(74) *Attorney, Agent, or Firm* — Wenderoth, Lind & Ponack, L.L.P.

(57) ABSTRACT

An electric power-assisted bicycle includes a transmission mechanism (3), a speed reduction mechanism (16) and a drive motor (15) which are arranged in parallel in the direction of the an axle, inside a rear hub (1) of a drive wheel. The transmission mechanism (3) and the speed reduction mechanism (16) are each formed by planetary gear mechanisms, and a planetary carrier (3*c*) is shared between the transmission mechanism and the speed reduction mechanism.

13 Claims, 2 Drawing Sheets

ELECTRIC POWER-ASSISTED BICYCLE

TECHNICAL FIELD

The present invention relates to an electric power-assisted bicycle in which supplementary force is added to a human power drive system by an electric motor.

BACKGROUND ART

There are various kinds of transmissions of a bicycle. Among the transmissions, generally, there are a type (an exterior transmission) which provides multistage sprockets in any one of a crank shaft and a rear axle or on both coaxes and changes gears by moving a chain between the sprockets using a derailleur, and a type (an interior transmission) which changes gears by exchanging a gear provided inside a rear hub of a rear wheel serving as a drive wheel.

Although the exterior transmission has a simple structure and is lightweight, it becomes a cause of wear on the sprocket and the chain and also a cause of loosening of the chain. Meanwhile, since the interior transmission has an advantage in that protection against dust and waterproofness are excellent and maintenance is free, the interior transmission is widely used for urban cycles.

However, in an electric power-assisted bicycle in which an electric motor adds supplementary force to a human power drive system, there has been an electric power-assisted bicycle which includes a motor, a speed reducer, and a transmission mechanism in the rear hub of the rear wheel serving as the drive wheel of the bicycle.

A so-called rear hub motor type electric power-assisted bicycle provided with a driving motor in the rear hub can use any one of the exterior transmission and the interior transmission when being combined with the transmission.

When using the exterior transmission, since the hub is mainly constituted by the motor and the speed reducer, the structure thereof is simplified, but there is a problem of maintenance due to the exterior transmission as mentioned above. Meanwhile, when using the interior transmission, since the structure of the hub is constituted by the motor, the speed reducer, and the transmission mechanism, the structure of the hub itself is complicated, but since there is an advantage owing to the interior transmission as mentioned above, it is advantageous.

At the present time, the electric power-assisted bicycle has been mainly used in urban cycles, and has mostly adopted the interior transmission. Thus, it also is considered preferable that the rear hub motor type electric power-assisted bicycle adopt the interior transmission.

As the structure of the electric power-assisted bicycle including such an interior transmission, for example, there are structures described in JP Patent publication 9-58568A and JP Patent publication 2000-043780A.

In such a structure, an electric motor (motor), a speed reduction mechanism, and a transmission mechanism are placed in the rear hub. As a driving mechanism using the electric motor, a driving electric motor and a speed reduction mechanism of a driving system that reduces the number of revolutions of the electric motor are provided. Furthermore, as an input mechanism of the human power, an inputting sprocket is provided in an axle of a drive wheel, and the transmission mechanism and the speed reduction mechanism are sequentially placed toward an outer circumference from the axle.

The rear hub includes a rotation casing and a fixed casing, the input mechanism of the human power system is placed on the rotation casing side, and the driving mechanism using the electric motor is mainly placed on the fixed casing side.

The human power applied by a pedal is transmitted to the sprocket of the drive wheel by a chain, is transmitted to the speed reduction mechanism of the human power system after being shifted by the transmission mechanism, and rotates the drive wheel through the rotation casing. Furthermore, driving force due to the electric motor is decelerated by a speed reduction mechanism of an electric power system provided separately from the speed reduction mechanism of the human power system mentioned above, and then, the human power driving force is combined with the electric driving force in the rotation casing and is transmitted to the drive wheel.

At this time, the driving force due to the human power converted into an electric signal, and an electric signal of a running speed from a speed sensor are input to a control section included in the electric power-assisted bicycle, and the control section outputs a driving signal based on a predetermined condition to control the electric motor.

However, in such a structure, the electric motor is placed in a position which deviates from an axial center of the axle. For this reason, there is a problem in that an outer diameter of the hub is increased. When the outer diameter of the hub is large, a weight balance tends to worsen.

At this point, according to the structure described in JP Patent publication 2002-293285A and JP Patent publication 2003-160089 A, since there is a configuration in which the speed reduction mechanism, the electric motor, and the transmission mechanism are added on the axle, an increase in size of the hub can be suppressed.

That is, in such a structure, the speed reduction mechanism, the electric motor and the transmission mechanism are added in the rear hub serving as the rear wheel of the drive wheel in a vehicle width direction, and the human power applied by the pedal is transmitted to the sprocket of the rear wheel via the chain, is shifted by the transmission mechanism via a one-way clutch, and then rotates the drive wheel through the rotation casing. Furthermore, the driving force due to the electric motor is decelerated by a speed reduction mechanism constituted by a planetary gear mechanism provided around the axle, and then the human power driving force is combined with the electric driving force in the rotation casing and the combined force is transmitted to the drive wheel.

However, according to the structure described in JP Patent publication 2002-293285A and JP Patent publication 2003-160089 A, the output from the electric motor is transmitted to a hub case (rotation casing) via the speed reduction mechanism, and the driving force from the pedal is transmitted to the hub case (rotation casing) via the transmission mechanism.

For this reason, three mechanisms of the speed reduction mechanism, the electric motor and the transmission mechanism arranged in a row along the axial center of the axle each have an independent structure. That is, the transfer mechanism of the human power driving force and the transfer mechanism of the electric driving force are individually interposed in each different route.

Since a space of the drive wheel in the axle direction is limited, in such a structure, the space of the transmission mechanism is reduced, and thus it is difficult to increase the number of speeds.

SUMMARY OF THE INVENTION

Thus, an object of the present invention is to make the apparatus compact in a configuration in which three mechanisms of a speed reduction mechanism, an electric motor and a transmission mechanism are provided in parallel along an axial center of an axle.

In order to solve the problems mentioned above, according to an aspect of the present invention, in a configuration in which a transmission mechanism, a speed reduction mechanism, and a driving motor are arranged in parallel in an axle direction in a hub of a drive wheel, the transmission mechanism and the speed reduction mechanism are each constituted by a planetary gear mechanism, and compactness in the axle direction is promoted by sharing a planetary carrier between the transmission mechanism and the speed reduction mechanism.

According to a specific configuration, there is provided an electric power-assisted bicycle including: a drive wheel that includes a hub and an axle, a transmission mechanism, a speed reduction mechanism, a driving motor; and a transmission control mechanism, the transmission mechanism, the speed reduction mechanism, and the driving motor being placed in juxtaposition with each other in an axial direction of the axle in the hub of the drive wheel, wherein the transmission mechanism has a function of transmitting driving force due to leg-power from a pedal to the drive wheel via a sprocket, the speed reduction mechanism has a function of transmitting driving force from the driving motor to the drive wheel, the transmission mechanism is constituted by a (first) planetary gear mechanism including at least one (first) sun gear, (first) planetary gears meshed with the sun gear, and a planetary carrier supporting the planetary gears, the transmission control mechanism performs a gear shifting such that the sun gear is switched over in a rotatable and non-rotatable manner around the axle with respect to the driving force from the sprocket, the speed reduction mechanism is constituted by the planetary gear mechanism including at least one sun gear, and speed reducer (second) planetary gears meshed with the (second) sun gear, and the (second) planetary gears are supported by the planetary carrier of the transmission mechanism or a member that is rotated integrally with the planetary carrier of the transmission mechanism.

According to the configuration, the speed reducer planetary gear is held by the planetary carrier or the member rotated integrally with the planetary carrier. That is, since the planetary carrier and the speed reducer planetary carrier form an integrally rotating structure, the planetary carrier can be shared between the transmission mechanism and the speed reduction mechanism, and thus compactness of the apparatus in the axle direction can be realized.

In the configuration, the sprocket is provided on a first end of the axle, the driving motor is provided on a second end of the axle, and the transmission mechanism and the speed reduction mechanism can adopt a configuration provided between the sprocket and the driving motor.

When the transmission mechanism and the speed reduction mechanism are provided between the sprocket of the first end of the axle and the driving motor of the second end thereof, since the transmission planetary carrier and the speed reducer planetary carrier come close to each other, the structure for sharing the carrier between the transmission mechanism and the speed reduction mechanism can be further simplified.

Furthermore, in the respective configurations, a regeneration mechanism can also be added. That is, the configuration includes the regeneration mechanism in which a one-way reverse-input clutch (first one-way clutch) is provided between the transmission sun gear and the axle, and by locking the one-way reverse-input clutch, the reverse input can be transmitted from the drive wheel to the driving motor, and regeneration electric power generated by the reverse input is returned to a secondary battery.

As the one-way reverse-input clutch, for example, a ratchet clutch mechanism may be adopted.

According to the configuration including the one-way reverse-input clutch, at the time of drive advance, driving force is transmitted from the sprocket of the drive wheel to the hub via the transmission mechanism, and the bicycle advances. At this time, regarding the driving force, the one-way reverse-input clutch always idles.

Meanwhile, during forward freewheeling, the reverse input is transmitted to the motor via the one-way reverse-input clutch, and thus regeneration power generation is possible. That is, the one-way reverse-input clutch is provided between the sun gear and the axle so that the sun gear cannot always turn around the axle with respect to the reverse input from the tire. Accordingly, the reverse input from the tire is transmitted to the driving motor, and thus the regeneration charging is possible.

At this time, although the reverse input from the tire is always transmitted to the driving motor, since performance of the regeneration charging can be controlled by a known control mechanism provided separately, for example, it is possible to turn the switch of the regeneration charging on by the operation of the brake lever.

Furthermore, the transmission control mechanism can adopt a configuration in which the one-way transmission clutches are included between the transmission sun gear and the axle, and the gear shifting is performed by switching any one of the transmission sun gear so as to be non-rotatable around the axle while switching the other thereof so as to be rotatable by each of the one-way transmission clutches.

In addition, although a known one-way clutch can be adopted as the structure of the one-way transmission clutch, for example, a ratchet clutch mechanism can be adopted.

Because there is a limitation in the space in the hub, a length of each sun gear in the axle direction needs to be short. For this reason, by constituting the one-way reverse-input clutch and the one-way transmission clutch by the ratchet clutch, it is possible to place a one-way transmission clutch claw and a one-way reverse-input clutch claw in the same position in the axle direction, and thus the axial length of the sun gear can be reduced.

When the ratchet clutch is adopted as the one-way transmission clutch, for example, it is possible to adopt a configuration in which the transmission control mechanism includes a transmission sleeve that is fitted around the axle, and by rotating the transmission sleeve around the axle, the one-way transmission clutch is switched between a rotatable state and a non-rotatable state.

Since there is a limitation in the space of the axle in the hub in the axial direction, in this manner, the transmission control mechanism preferably uses a mechanism that performs the switch-over of each one-way transmission clutch by rotating (oscillating) the transmission sleeve around the axle.

As a specific example thereof, the one-way transmission clutch has a transmission clutch cam surface on one side of the transmission sun gear and the axle, and has an oscillatory gear shifting clutch claw that can be meshed with the transmission clutch cam surface n the other side thereof, the transmission sleeve has a cutout portion in a part in a circumferential direction thereof, the cutout portion is moved between the position of the transmission clutch cam surface and a position retracted from the transmission clutch cam surface by rotating the transmission sleeve around the axle, and the switch-over of the one-way transmission clutch is performed by the movement.

Furthermore, as the speed reducer planetary gear included in the speed reduction mechanism, for example, two-stage gears can be used. By using two-stage gears as the planetary gear, a high speed reduction ratio can be obtained. Of course, since the number of stages can be arbitrarily set depending on the specification required for the electric power-assisted bicycle, for example, one stage can be set, and three or more stages can be set.

In addition, it is possible to adopt a configuration in which the output shaft of the driving motor and the axle are connected to each other in a coaxial form, and the output shaft and the axle are supported by a bearing in a relatively rotatable manner. By supporting the axle and the output shaft of the driving motor by the bearing in a relatively rotatable manner, rigidity of the axle and the driving motor is improved.

The present invention can make the apparatus compact in the three-mechanism configuration which includes the speed reducer, the electric motor and the transmission mechanism in parallel along the axial center of the axle.

DETAILED DESCRIPTION OF THE INVENTION

Figure 2:
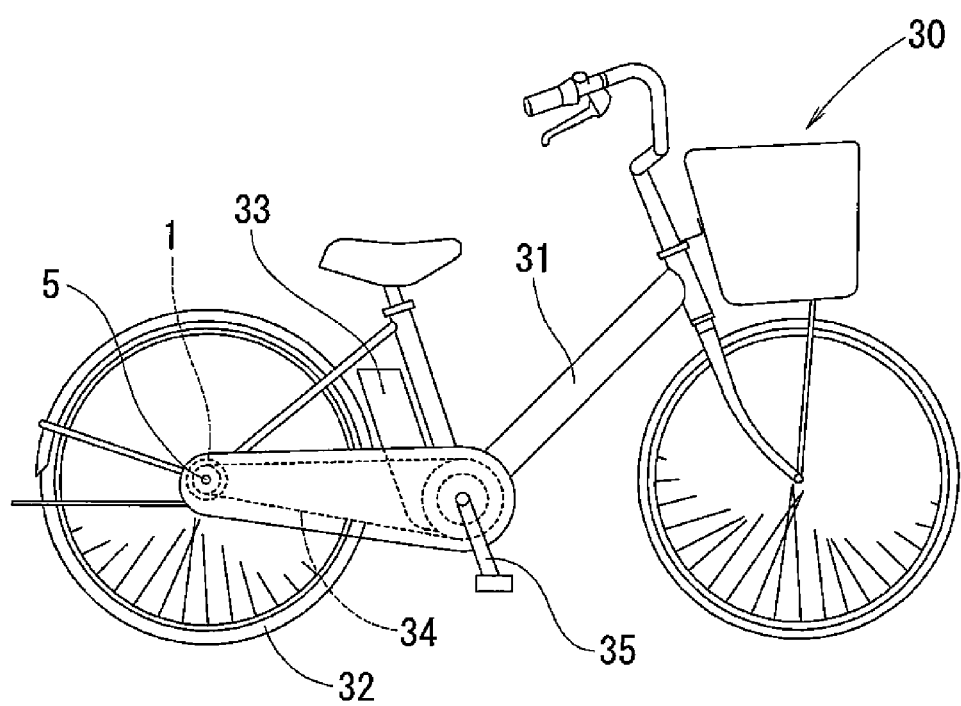
FIG. 2 is an entire view of an electric power-assisted bicycle having the hub of FIG. 1.

Embodiments of the present invention will be described based on the drawings. An electric power-assisted bicycle of the present embodiment is a rear hub motor type electric power-assisted bicycle 30 in which a driving motor 15 is provided inside a hub 1 (hereinafter referred to as a "rear hub 1") of a rear wheel 32 serving as a drive wheel as shown in FIG. 2.

During operation when leg-power transmitted from a crankshaft through a pedal 35 is input, driving force can be transmitted to the rear wheel 32 via a power transmitting element 34 such as a chain connecting a sprocket 4 (hereinafter referred to as a "rear sprocket 4") of the rear wheel 32.

The driving force due to the output of the driving motor 15 can be transmitted to the rear wheel 32 via a speed reduction mechanism 16 in the hub 1.

During forward freewheeling, reverse input from the rear wheel 32 is transmitted to the driving motor 15 via the speed reduction mechanism 16 (in the case of reverse input, speed is increased) or the like, and a regeneration mechanism which returns regeneration electric power generated by reverse input to a secondary battery 33 supported by a frame 31 is provided.

Figure 1:
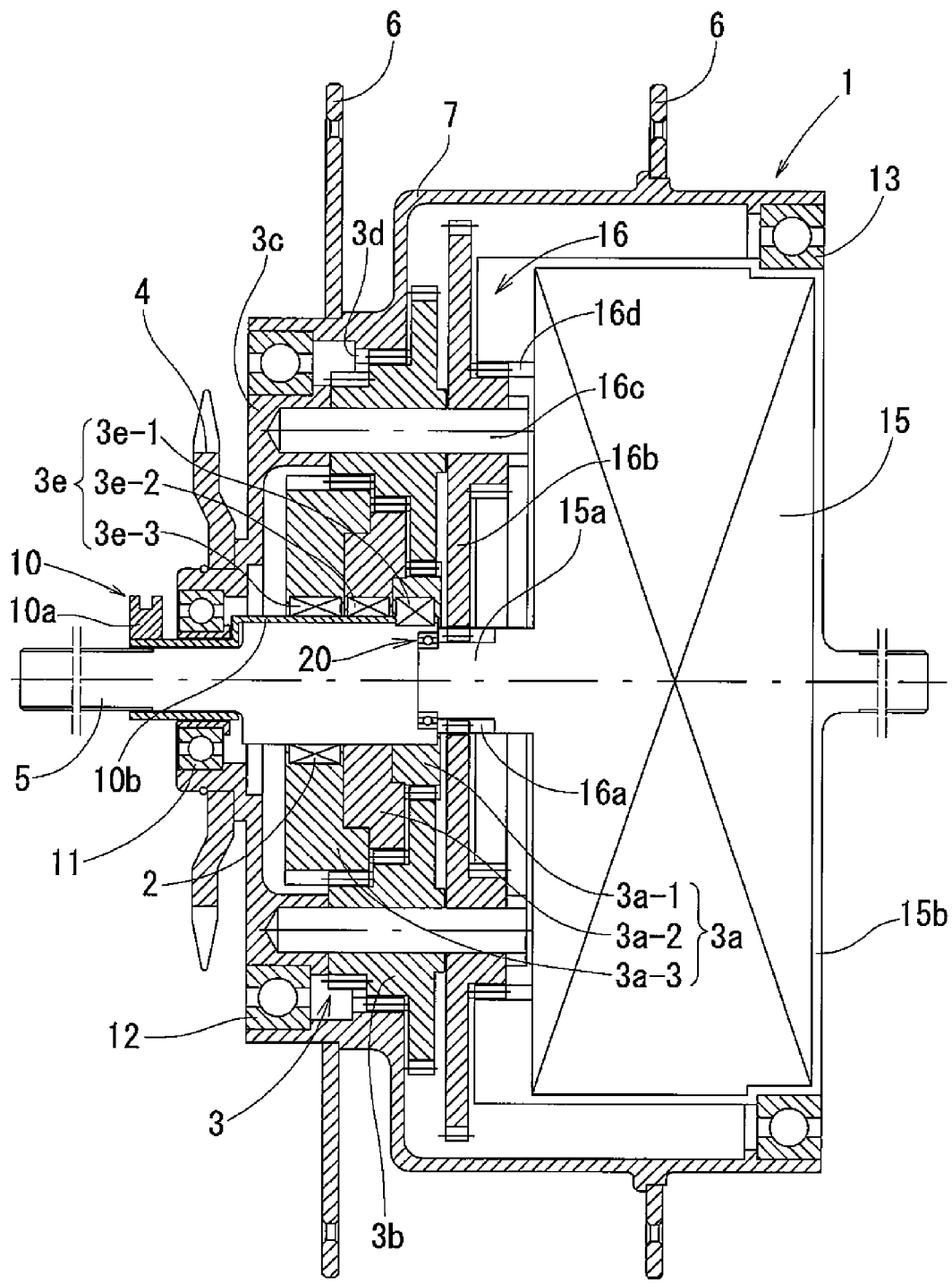
FIG. 1 is a front view of a hub according to an embodiment of the present invention.

As shown in FIG. 1, the rear hub 1 includes a transmission mechanism 3, the speed reduction mechanism 16 and the driving motor 15 inside a hub case 7 provided in the same shaft as an axle 5 of the rear wheel. The transmission mechanism 3 is constituted by a planetary gear mechanism in which the speed can be increased in three stages.

The transmission mechanism 3 includes sun gears 3*a* provided on an outer circumference of the axle 5 via one-way transmission clutches (first one-way clutches) 3*e*. In the embodiment, the sun gears 3*a* are constituted by three sun gears, that is, a first sun gear 3*a*-1, a second sun gear 3*a*-2 and a third sun gear 3*a*-3.

The first sun gear 3*a*-1, the second sun gear 3*a*-2 and the third sun gear 3*a*-3 are connected via a first one-way clutch 3*e*-1, a second one-way clutch 3*e*-2 and a third one-way clutch 3*e*-3.

A one-way reverse-input clutch (second one-way clutch) 2 is included between the third sun gear 3*a*-3 and the axle 5.

In the present embodiment, a ratchet clutch is adopted as each of the first one-way clutch 3*e*-1, the second one-way clutch 3*e*-2, the third one-way clutch 3*e*-3, and the one way reverse-input clutch 2.

Each of the first one-way clutch 3*e*-1, the second one-way clutch 3*e*-2, the third one-way clutch 3*e*-3, and the one-way reverse-input clutch 2 has a structure in which a clutch claw is engaged with or disengaged from a clutch cam surface provided on the outer circumference of the axle 5. In addition, one end of each clutch claw is biased toward the clutch cam surface in a rising direction by an elastic member.

Since there is a limitation in a space in the rear hub 1, a length of the transmission sun gears 3*a* in the axial direction of the axle 5 should be set as short as possible. In the present embodiment, by constituting the reverse input one-way clutch 2 and the one-way transmission clutches 3*e* by the ratchet clutch, it is possible to place the clutch claw of the one-way reverse input clutch 2 and one of the clutch claws of the one-way transmission clutches 3*e* in the same position in the axial direction of the axle 5. Thus, shortening of the length of the transmission sun gears 3*a* in the axial direction is realized.

The one-way reverse-input clutch 2 may be provided between the first sun gear 3*a*-1 and the axle 5, or between the second sun gear 3*a*-2 and the axle 5.

The transmission mechanism 3 includes transmission planetary gears 3*b* each having three gear portions having different numbers of teeth and meshing with the first sun gear 3*a*-1, the second sun gear 3*a*-2 and the third sun gear 3*a*-3, respectively, a transmission planetary carrier 3*c* supporting the transmission planetary gears 3*b*, a transmission outer ring gear 3*d* meshed with the transmission planetary gears 3*b*, and a hub case 7 integral with the outer ring gear 3*d*.

In the present embodiment, although the transmission outer ring gear 3*d* is formed integrally with the hub case 7, it is also possible to consider a configuration in which the transmission outer ring gear 3*d* is formed separately from the hub case 7 and both of the transmission outer ring gear 3*d* and the hub case 7 mesh with each other so as to be rotated together.

Furthermore, bearing portions 11 and 12 are provided between the planetary carrier 3*c* and the axle 5, and between the hub case 7 and the planetary carrier 3*c*, respectively. The planetary carrier 3*c* and the axle 5, and the planetary carrier 3*c* and the hub case 7 are supported so as to be relatively rotatable by the respective bearing portions 11 and 12.

Furthermore, a bearing portion 13 is provided between a motor housing 15*b* holding the driving motor 15 and the hub case 7. The motor housing 15*b*, the hub case 7 and the axle 5 are supported by the bearing portion 13 so as to be relatively rotatable.

In the present embodiment, the outer ring gear is meshed with the gear portion of each transmission planetary gear 3*b* having the second largest number of teeth among the three gear portions of each transmission planetary gear 3*b*. The outer ring gear may be meshed with another gear portion. But since the speed increasing ratio can be increased, the present embodiment is preferable.

Any one of the transmission sun gears 3*a* (corresponding to the first sun gear 3*a*-1, the second sun gear 3*a*-2, and the third sun gear 3*a*-3) can be selectively fixed to the axle 5 against the driving force through operation of a transmission control mechanism 10. That is, by operating the transmission control mechanism 10, any one of the first sun gear 3*a*-1, the second sun gear 3*a*-2, and the third sun gear 3*a*-3 can be rotationally fixed to the axle 5 against driving force through the corresponding one of the first one-way clutch 3e-1, second one-way clutch 3e-2, and third one-way clutch 3e-3. At that time, the unfixed gears are switched so as to be relatively rotatable with respect to the axle 5.

For example, when the first sun gear 3a-1 is fixed to the axle 5 and the second sun gear 3a-2 and the third sun gear 3a-3 are not fixed to the axle 5, rotation speed from the rear sprocket 4 is increased from the planetary carrier 3c and is transmitted to the hub case 7 (the transmission outer ring gear 3d).

At this time, when the number of teeth of the first sun gear 3a-1 is a, the number of teeth of each transmission planetary gear 3b meshed with the second sun gear 3a-2 is b, the number of teeth of each transmission planetary gear 3b meshed with the first sun gear 3a-1 is c, and the number of teeth of the transmission outer ring gear 3d is d, the speed increasing ratio from the planetary carrier 3c to the transmission outer ring gear 3d is $[(a \times b)/(c \times d)]+1$. At this time, the second sun gear 3a-2 and the third sun gear 3a-3 are idling, and are not involved in torque transmission.

When fixing the second sun gear 3a-2 to the axle 5, if the number of teeth of the second sun gear 3a-2 is a and the number of teeth of the transmission outer ring gear 3d is d, the speed increasing ratio from the planetary carrier 3c to the transmission outer ring gear 3d is $(a+d)/d$.

When fixing the third sun gear 3a-3 to the axle 5, if the number of teeth of the third sun gear 3a-3 is a, the number of teeth of the transmission planetary gears 3b meshed with the second sun gear 3a-2 is b, the number of teeth of the transmission planetary gears 3b meshed with the third sun gear 3a-3 is c, and the number of teeth of the transmission outer ring gear 3d is d, the speed increasing ratio from the planetary carrier 3c to the transmission outer ring gear 3d is $[(a \times b)/(c \times d)]+1$.

The switch-over of the one-way transmission clutch 3e using the transmission control mechanism 10, that is, the switch-over operation for locking one of the first one-way clutch 3e-1, the second one-way clutch 3e-2 and the third one-way clutch 3e-3 and making the others free, can be performed by rotating a transmission sleeve 10b provided on the outer circumference of the axle 5 around the axis of the axle 5. The rotation operation of the transmission sleeve 10b can be performed by an operation portion 10a provided at the end portion of the axle 5.

As a configuration of the transmission sleeve 10b, a cutout portion is formed in a part in a circumferential direction thereof, the cutout portion is moved between the position of each transmission clutch cam surface and the position retracted from the transmission clutch cam surface by rotating the transmission sleeve 10b around the axis of the axle 5, and the one-way transmission clutches 3e are switched over by this movement. When the cutout portion is present in the portion of the clutch claw of any one of the ratchet clutches, this clutch claw can be engaged with the clutch cam surface, and when the cutout portion does not face one of these, the engagement of the clutch claw with the clutch cam surface is restricted by the transmission sleeve 10b.

The speed reduction mechanism 16 uses teeth provided on the outer circumference of the output shaft 15a of the driving motor 15 as a speed reducer sun gear 16a, and includes speed reducer two-stage planetary gears 16b meshed with the speed reducer sun gear 16a, a speed reducer outer ring gear 16d (fixed) integrated with the motor housing 15b, and a planetary carrier which holds the speed reducer planetary gears 16b.

The speed reducer planetary carrier is constituted by the transmission planetary carrier 3c included in the transmission mechanism 3. That is, the transmission planetary gears 3b and the speed reducer planetary gears 16b are supported on the planetary carrier 3c by common shafts 16c. By sharing the planetary carrier between the transmission mechanism and the speed reduction mechanism, compactness in the axle direction is promoted.

In the present embodiment, the output shaft 15a of the driving motor 15 and the axle 5 are connected to each other by a bearing 20 so as to be coaxial with each other. The output shaft 15a and the axle 5 can be relatively rotated around the shaft by the bearing 20. By supporting the output shaft 15a of the driving motor 15 by the bearing 20 with respect to the axle 5 in a relatively rotatable manner, it is possible to expect an improvement in rigidity of the axle 5 and the driving motor 15.

As shown in FIG. 1, the driving motor 15 is arranged in juxtaposition with the transmission mechanism 3 in the axial direction, and output of the transmission driving motor 15 is slowed down and transmitted to the planetary carrier 3c via the speed reduction mechanism 16.

Output from the planetary carrier 3c is increased by the transmission mechanism 3 and transmitted to the hub case 7. The speed increasing ratio of this time differs depending on the states of the first one-way clutch 3e-1, the second one-way clutch 3e-2, and the third one-way clutch 3e-3 using the transmission control mechanism 10.

Output from the driving motor 15 is set as below. When the number of teeth of the speed reducer planetary gears 16b meshed with the speed reducer sun gear 16a is a, the number of teeth of the speed reducer outer ring gear 16d is b, the number of teeth of the speed reducer sun gear 16a is c, and the number of teeth of the speed reducer planetary gears 16b meshed with the speed reducer outer ring gear 16d is d, the speed reducing ratio from the speed reducer sun gear 16a to the planetary carrier 3c is $[(a \times b)/(c \times d)]+1$.

During forward freewheeling, reverse input from the tire is transmitted from the hub case 7 to the transmission planetary gear 3b. At this time, the third sun gear 3a-3 is fixed to the axle 5 against reverse input by the one-way reverse-input clutch 2 provided between the third sun gear 3a-3 and the axle 5.

As a consequence, reverse input from the tire is reduced via the transmission mechanism 3, transmitted to the planetary carrier 3c, and increased and transmitted to the driving motor 15 via the speed reduction mechanism 16, and thus the regeneration charging is possible.

At this time, the third sun gear 3a-3 is fixed to the axle 5 against reverse input without depending on the states of the first one-way clutch 3e-1, the second one-way clutch 3e-2, and the third one-way clutch 3e-3 using the transmission control mechanism 10.

With such a configuration, the driving force (leg-force) from the rear sprocket 4 is increased and is transmitted to the tire. Furthermore, the driving force from the driving motor 15 is reduced via the speed reduction mechanism 16, transmitted to the planetary carrier 3c, then increased via the transmission mechanism 3 and transmitted to the tire.

Meanwhile, reverse input torque from the tire is reduced by the speed reduction mechanism 3, increased by the speed reduction mechanism 16, and transmitted to the driving motor 15, and thus the regeneration charging is possible.

In the present embodiment, the number of stages of the transmission planetary gears 3b is three and a three-stage transmission mechanism 3 is adopted, but the number of stages of the transmission planetary gears 3b can be two, or four or more.

As another configuration of the transmission control mechanism 10, it is also possible to consider moving and operating the transmission sleeve 10b in the axial direction of the axle 5. That is, by moving the transmission sleeve 10b in the axial direction of the axle 5, the cutout portion is moved between the position of each transmission clutch cam surface and the position retracted from the transmission clutch cam surface, and the one-way transmission clutches 3e are switched over by this movement.

In the embodiment, in the one-way transmission clutch 3e constituted by the ratchet clutch, although a type of switching the engagement of each clutch claw of the ratchet clutch with the clutch cam surface to a state in which the engagement can be made by the transmission sleeve 10b and a state in which the engagement cannot be made has been adopted, as means for switching the axle 5 and the transmission sun gear 3a into a relatively rotatable state and a relatively non-rotatable state, other configurations may be adopted. Furthermore, as the transmission mechanism, a known bicycle transmission mechanism may be used.

In the present embodiment, although the first one-way clutch 3e-1, the second one-way clutch 3e-2, the third one-way clutch 3e-3, and the one-way reverse-input clutch 2 each adopt a ratchet clutch, a one-way clutch constituted by other configurations such as a roller clutch, and a sprag clutch may be adopted.

The invention claimed is:

1. An electric power-assisted bicycle comprising:
   a drive wheel including a hub and an axle;
   a transmission mechanism;
   a speed reduction mechanism;
   a driving motor; and
   a transmission control mechanism,
   wherein the transmission mechanism, the speed reduction mechanism, and the driving motor are placed in juxtaposition with each other in an axial direction of the axle in the hub of the drive wheel,
   wherein the transmission mechanism is arranged to transmit driving force from pedals to the drive wheel through a sprocket, the speed reduction mechanism is arranged to transmit driving force from the driving motor to the drive wheel, the transmission mechanism is constituted by a first planetary gear mechanism comprising at least one first sun gear, a first set of planetary gears meshed with the first sun gear, and a planetary carrier supporting the first set of planetary gears, the transmission control mechanism performs gear shifting such that the first sun gear is switched over in a rotatable and non-rotatable manner around the axle with respect to the driving force from the sprocket, the speed reduction mechanism is constituted by a second planetary gear mechanism comprising at least one second sun gear, a second set of and planetary gears meshed with the second sun gear, wherein the second set of planetary gears are supported by the planetary carrier or a member that is rotated integrally with the planetary carrier.

2. The electric power-assisted bicycle according to claim 1, wherein the sprocket is provided at a first end of the axle, the driving motor is provided at a second end of the axle, and the transmission mechanism and the speed reduction mechanism are provided between the sprocket and the driving motor.

3. The electric power-assisted bicycle according to claim 2, further comprising:
   A first one-way clutch for reverse input provided between the at least one first sun gear and the axle;
   a secondary battery; and
   a regeneration mechanism;
   wherein a reverse input is transmitted from the drive wheel to the driving motor via the first one-way clutch in a state where the first one-way clutch input is locked, and
   wherein the regeneration mechanism returns regeneration electric power generated by the reverse input to the secondary battery.

4. The electric power-assisted bicycle according to claim 2, wherein the at least one first sun gear comprises a plurality of first sun gears, wherein the transmission control mechanism includes a set of second one-way clutches provided between the plurality of first sun gears, respectively, and the axle, wherein any one of the second one-way clutches can be locked, thereby rotationally fixing the corresponding one of the plurality of first sun gears to the axle, while keeping the other first sun gear or gears rotatable relative to the axle.

5. The electric power-assisted bicycle according to claim 1, wherein the at least one first sun gear comprises a plurality of first sun gears, wherein the transmission control mechanism includes a set of second one-way clutches provided between the respective first sun gears and the axle, wherein any one of the second one-way clutches can be locked, thereby rotationally fixing the corresponding one of the plurality of first sun gears to the axle, while keeping the other first sun gear or gears rotatable relative to the axle.

6. The electric power-assisted bicycle according to claim 5, wherein the second one-way clutches are ratchet clutches.

7. The electric power-assisted bicycle according to claim 6, wherein the transmission control mechanism further includes a sleeve fitted around the axle, and by rotating the sleeve around the axle, the second one-way clutches are respectively switched between a rotatable state and a non-rotatable state.

8. The electric power-assisted bicycle according to claim 1, wherein the second set of planetary gears comprises two-stage gears.

9. The electric power-assisted bicycle according to claim 1, wherein an output shaft of the driving motor and the axle are connected to each other in a coaxial form, and the output shaft and the axle are supported by a bearing in a relatively rotatable manner.

10. The electric power-assisted bicycle according to claim 1, further comprising:
    a first one-way clutch provided between the at least one first sun gear and the axle;
    a secondary battery; and
    a regeneration mechanism;
    wherein a reverse input is transmitted from the drive wheel to the driving motor via the first one-way clutch in a state where the first one-way clutch is locked, and
    wherein the regeneration mechanism returns regeneration electric power generated by the reverse input to the secondary battery.

11. The electric power-assisted bicycle according to claim 10, wherein the first one-way clutch is constituted by a ratchet clutch mechanism.

12. The electric power-assisted bicycle according to claim 11, wherein the at least one first sun gear comprises a plurality of first sun gears, wherein the transmission control mechanism includes a set of second one-way clutches provided between the plurality of first sun gears, respectively, and the axle, wherein any one of the second one-way clutches can be locked, thereby rotationally fixing the corresponding one of the plurality of first sun gears to the axle, while keeping the other first sun gear or gears rotatable relative to the axle.

13. The electric power-assisted bicycle according to claim 10, wherein the at least one first sun gear comprises a plurality of first sun gears, wherein the transmission control mechanism includes a set of second one-way clutches provided between the plurality of first sun gears, respectively and the axle, wherein any one of the second one-way clutches can be locked, thereby rotationally fixing the corresponding one of the plurality of first sun gears to the axle, while keeping the other first sun gear or gears rotatable relative to the axle.

* * * * *